March 24, 1970   P. A. FLEURY V ETAL   3,502,958
ELECTRIC FIELD TUNABLE COHERENT OPTICAL DEVICE
Filed Sept. 25, 1967
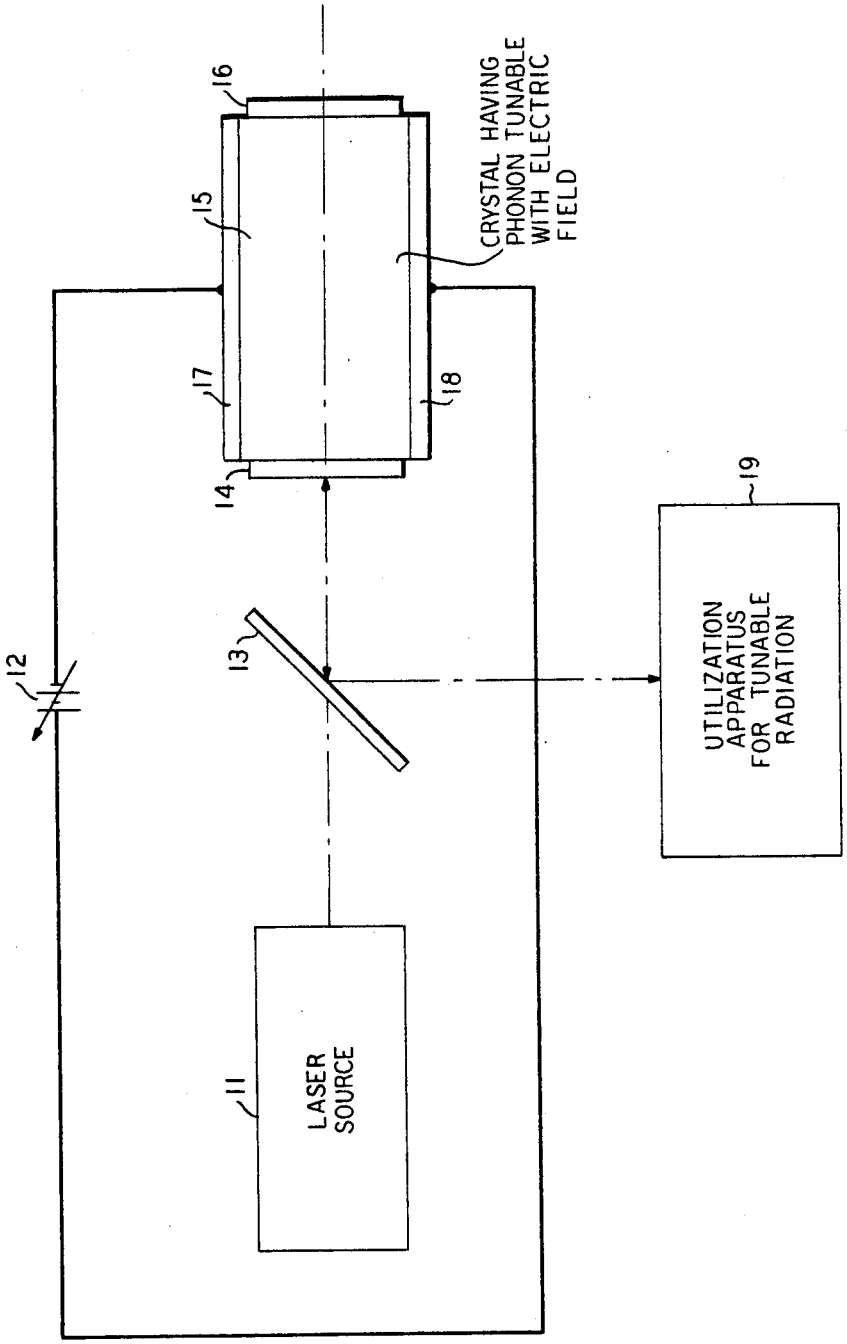
INVENTORS P. A. FLEURY V
J. M. WORLOCK
BY Wilford L. Wisner
ATTORNEY

United States Patent Office 3,502,958
Patented Mar. 24, 1970

3,502,958
ELECTRIC FIELD TUNABLE COHERENT OPTICAL DEVICE
Paul A. Fleury V, Fair Haven, and John M. Worlock, Plainfield, N.J., assignors to Bell Telephone Laboratories, Incorporated, Murray Hill, N.J., a corporation of New York
Filed Sept. 25, 1967, Ser. No. 670,295
Int. Cl. H02m 5/06
U.S. Cl. 321—69   6 Claims

ABSTRACT OF THE DISCLOSURE

Electric field tuning of coherent light over broad bands of frequencies is disclosed in an oscillator employing a paraelectric crystal, such as strontium titanate, having a phonon of frequency variable with temperature, commonly called the soft phonon mode, the frequency of which is now found to be responsive to the amplitude of the applied electric field.

In addition, many other properties of solids, such as optical and mechanical properties, depend upon the phonons and can be employed in appropriate devices to produce a variable detectable coherent output dependent upon the applied electric field.

Background of the invention

In the coherent optical device are, a highly desirable sort of device is one that is continuously tunable over a broad band of frequencies. Moreover, among tunable devices, the most desirable are those in which the tuning requires no mechanical adjustment. This invention is directed to such a device, one which is tuned by variation of an electric field.

Investigation of the properties of crystals and of the properties of other forms of matter increasingly creates a need for a source of continuously tunable coherent radiation. In the future, optical communication systems also may need broadly tunable local oscillator sources, particularly for optical superheterodyne systems analogous to present-day radio systems.

Magnetic-field-tunable lasers and other coherent optical oscillators of various sorts have previously been proposed. Also, fine tuning of some lasers or parametric mixers by means of electric fields has been proposed. Most such electric-tuning proposals involve the tuning of a resonator within the natural linewidth of a fixed laser line and yield a tuning band that is too narrow for most of the above-described purposes.

Summary of the invention

We have discovered surprisingly broad bands of electric field tuning in certain active media under conditions that enable a relatively low threshold for stimulated coherent oscillation along an axis aligned with the path of the pumping radiation. The active media include crystals of materials that exhibit paraelectric behavior and that have a phonon of frequency that decreases with decreasing temperature. The active media also include materials that reach a ferroelectric transition and those, such as strontium titanate and potassium tantalate, that never quite reach a ferroelectric transition with decrease of temperature. In addition, they include materials exhibiting a soft phonon mode associated with more general types of phase transition.

A phonon, or phonon mode, is a crystalline lattice vibration having a discrete frequency or a nonthermal distribution of frequencies. In the case of the present invention, the phonon involved has a relatively narrow frequency band. Because of its frequency-variability with temperature, it is commonly called the soft phonon mode.

More particularly, we have discovered that increase of the applied electric field at constant temperature increases the frequency of the phonon. While effects of temperature and electric field on low frequency dielectric constant have heretofore been observed and while the Lyddane Sachs Teller relation predicts that the product of dielectric constant and the square of the phonon frequency should be a constant independent of temperature, the independence or dependence of this constant with respect to variation of electric field had never been demonstrated experimentally.

In a specific embodiment of our invention, the applied electric field also induces a Raman-scattering cross-section of the phonon. We have also found that the Raman cross-section is relatively large and will provide a low threshold of pump intensity for stimulated scattering, i.e., Raman oscillator action. This Raman-scattering is tunable by the electric field because the frequency of the Raman-scattered light is equal to the frequency of the pumping light plus or minus the phonon frequency. In this specific embodiment, the phonon is also infrared active and therefore radiative. Thus, two tunable bands of coherent radiation can be obtained simultaneously.

We have found it advantageous to select the back-scattered portion of the Raman-scattered light as a tunable output, in order to avoid so-called polariton effects.

According to another aspect of our invention, electric field modulation of light is achieved.

Brief description of the drawing

Further features and advantages of our present invention will become apparent from the following detailed description, taken together with the drawing, in which the sole figure is a partially schematic and partially block diagrammatic illustration of a preferred embodiment of the invention.

Description of illustrative embodiment

In the illustrative embodiment of the drawing, visible coherent light from a laser source 11 is converted to light, or infrared radiation, tunable over one or more broad frequency ranges in response to the variable, direct-current voltage from a source 12.

A portion of the laser light from source 11 is passed through a 50 percent transmissive reflector 13 and an antireflection coating 14 into the body of a paraelectric crystal 15, illustratively strontium titanate (SrTiO₃). An electric field is applied to the crystal 15 from the variable voltage source 12 by means of electrodes 17 and 18, which are disposed on lateral surfaces of the crystal 15 and are connected to the negative and positive terminals of source 12.

Transmission of the unused pumping radiation from crystal 15 without significant reflection is provided by the antireflection coating 16 on the surface opposite coating 14. The coating 16 also transmits the forward-directed infrared radiation as an output.

The back-scattered tunable light, which is a portion of the light Raman-scattered from the pumping light, is extracted through the antireflection coating 14; and half of the extracted tunable light is received by reflection from 50 percent transmissive reflector 13 into a utilization apparatus 19 that can use the tunable radiation. The uncoated lateral surfaces of crystal 15 are typically mounted on cold fingers (not shown) to maintain the crystal at about 8 degrees Kelvin, or at least in a range of responsiveness of the soft phonon mode to electric field. In strontium titanate, this range lies between about 4 degrees Kelvin and 50 degrees Kelvin.

The laser source 11 is illustratively a pulsed ruby laser operating at about 6943 A. (Angstrom units). Alternatively, a laser 11 could be any laser providing a beam of substantial power, whether on a pulsed or continuous wave basis, at a wavelength from the near infrared to the band gap of crystal 15, which is in the ultraviolet for strontium titanate. A laser operating between 4000 A. and 7000 A. is preferred; nevertheless, a laser employing neodymium ions in an yttrium aluminum garnet or a glass host and operating at 1.06 microns (10,600 A.) in the near infrared is also an excellent choice for laser source 11.

Fifty percent transmissive reflector 13 is, in conjunction with the antireflection coating 14, a means for extracting the back-scattered tunable radiation from the crystal 15. A multiple-layer dielectric reflector is illustratively employed for reflector 13.

The antireflection coatings 14 and 16 are preferably multiple-layer dielectric coatings of the type well known in the optical art. According to one modification that may be advantageous, they can readily provide narrow-band reflectivity for a band of Raman-scattered light frequencies or for the infrared light frequencies while still being antireflection coatings at other frequencies. Also, various types of Raman oscillator resonators could be employed.

The crystal 15 is preferably single-crystal strontium titanate, but could also be polycrystalline. It is typically about three centimeters long by one millimeter by one millimeter. Crystal 15 could also be another material exhibiting a soft phonon mode, such as potassium tantalate ($KTaO_3$) or barium titanate ($BaTiO_3$). While it is known that the materials specifically mentioned have a characteristic cubic type of crystalline structure above the temperatures at which they exhibit or approach ferroelectric behavior, we do not wish to limit our invention to cubic-type crystalline structures. Ferroelectric materials may be employed for crystal 15 if maintained above their ferroelectric transition temperatures in their paraelectric phase, so that they exhibit paraelectric behavior. In most ferroelectric materials, the phonon tunability with electric field should be attainable in an appreciable range of temperatures above the ferroelectric transition temperature.

In operation, half of the 6943 A. laser radiation from source 11 passes through 50 percent transmissive reflector 13 and then through antireflection coating 14 into the bulk of crystal 15. Source 12 produces an electric field across crystal 15 between electrodes 17 and 18. For $SrTiO_3$, at 8 degrees Kelvin, this field is about 400 volts per centimeter for a phonon frequency of 11 cm.$^{-1}$ and can be varied up to 12,000 volts per centimeter for a phonon frequency of 45 cm.$^{-1}$, where cm.$^{-1}$ is "wave numbers," defined as the frequency in cycles per second divided by the speed of light in centimeters per second. The field also induces Raman activity of the phonon; and this Raman activity, in the form of inelastic scattering of the 6943 A. pumping light, coexists with the normal infrared activity of the phonon. The infrared activity implies direct radiation, by the phonon, of light having a frequency equal to its phonon frequency.

The crystal 15 is sufficiently long (3 centimeters) that a substantial portion of the pumping light is Raman-scattered. A large portion of the scattering is back-scattering, since the so-called polariton effects inhibit the forward-scattered Raman radiation. Each polariton effect is a strong coupling between a lattice vibrational mode, or phonon, and an electromagnetic wave propagating in the direction of the phonon. This strong coupling gives the scattered light a frequency depending on its angle, up to a small acute angle, with respect to the pumping light. Thus, the light that passes through coating 16 is smeared over a wide band and is weak and largely incoherent.

Because of the length of crystal 15 and because of the exceptionally large Raman-scattering cross-section induced by the electric field, the threshold for stimulated Raman radiation is readily exceeded without an optical resonator. The stimulated Raman radiation propagates predominantly in the backward direction and is extracted through antireflection coating 14. Half of the extracted radiation is reflected by reflector 13 into utilization apparatus 19, where, for example, it may be used to study the properties of matter.

When the Raman radiation becomes stimulated and thus coherent, the infrared radiation of the phonon should also become predominantly coherent. In general, it will be difficult to extract as an output. The infrared radiation of the phonon does propagate predominantly in the forward direction; that is, in the direction of the 6943 A. pumping light. Once the infrared radiation becomes coherent, the crystal 15 no longer has its characteristic absorption at the phonon frequency and could become substantially transparent at that frequency, were it not for other sources of infrared absorption in that frequency band. While a strontium titanate crystal 15 will have such other sources of infrared absorption, other materials usable according to the present invention may have substantially less absorption for the coherent infrared radiation from the phonon. In that event, it may be practicable to extract the phonon-frequency radiation as an output through antireflection coating 16.

In any event, it may be seen that two tunable coherent radiations in two different frequency bands can, in principle, be achieved simultaneously according to our present invention. This cooperation will exist wherever the induced Raman-scattering of the infrared phonon in a paraelectric material can coexist with the natural infrared activity of the phonon. As the electric field from source 12 is varied, the frequencies of both radiations will be tuned over like frequency ranges.

The tunability of the infrared radiation, in one respect, is the most surprising tunability ever discovered in the art of electromagnetic wave generation since it is such a large percentage of the infrared light frequency itself. In strontium titanate, the phonon and its infrared radiation can be tuned from a frequency corresponding to 1000 microns up to a frequency corresponding to about 200 microns. In terms of wave members (cm.$^{-1}$), this is a frequency tunability from about 10 cm.$^{-1}$ to about 50 cm.$^{-1}$, or a tuning range of about 400 percent of the initial frequency that existed at low electric fields.

It is also within our contemplation that the variable electric field may be able to tune the frequency of a coherent phonon radiation without inducing substantial Raman-scattering. In addition, the soft phonon mode in some materials is naturally Raman active, so that the electric field merely tunes the Raman activity.

Other devices employing the variable phonon frequency are also within the scope of our invention. For example, the coherent light is frequently-modulated by supplying an amplitude-modulated electric field. Such a modulator would be useful for communication.

What is claimed is:

1. A coherent optical device comprising a body of a crystalline material exhibiting a phonon mode variable in frequency under the influence of a variable-amplitude electric field, means for supplying to said body coherent electromagnetic energy responsive to said phonon mode to produce a coherent radiation output having a freqeuncy dependent upon said phonon frequency, means for extracting for utilization said coherent radiation output along an axis aligned with the path of the supplied coherent electromagnetic energy, and means for applying to said body an electric field of variable amplitude.

2. A coherent optical device comprising a body of crystalline material exhibiting paraelectric behavior and having a crystalline lattice vibration that varies in frequency with temperature, means for supplying to said crystal coherent radiation to interact with said vibration and produce a coherent radiation having frequency dependent on the frequency of said vibration, means for extracting a portion thereof as an output along a path aligned with the path of the supplied coherent radiation, and means for applying to said body an electric field of variable strength to tune the freqeuncy of said vibration in dependence on said strength of said field.

3. A coherent optical device according to claim 2 in which the body of material is characterized by a substantial Raman-scattering cross-section associated with the vibration, whereby the extracted coherent radiation has a frequency equal to the frequency of the supplied radiation less the frequency of the vibration.

4. A coherent optical device according to claim 3 in which the body comprises a material in which the applied electric field induces the Raman-scattering cross-section.

5. A coherent optical device according to claim 3 in which the material is selected from the group consisting of crystalline strontium titanate ($SrTiO_3$), crystalline potassium tantalate ($KTaO_3$) and crystalline barium titanate ($BaTiO_3$).

6. A coherent optical device according to claim 2 in which the extracting means includes a pair of opposed anti-reflection coatings on the body of crystalline material, one of said coatings being interposed between the radiation supplying means and the body, the extracting means including means for receiving the radiation extracted through said one coating, whereby a substantial portion of the radiation extracted and received is coherent radiation back-scattered from the supplied radiation.

References Cited

Schaufele et al.: "Physics Letters," July 17, 1967, pp. 47–48.

JOHN KOMINSKI, Primary Examiner

D. R. HOSTETTER, Assistant Examiner

U.S. Cl. X.R.

307—88.3